United States Patent
Yagi et al.

(10) Patent No.: US 7,375,156 B2
(45) Date of Patent: *May 20, 2008

(54) EPOXIDIZED OR GRAFT-COPOLYMERIZED NATURAL RUBBER COMPOSITION FOR TIRE TREAD AND PNEUMATIC TIRE USING THE SAME

(75) Inventors: Noriko Yagi, Kobe (JP); Kiyoshige Muraoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 291 days.

This patent is subject to a terminal disclaimer.

(21) Appl. No.: 10/726,560

(22) Filed: Dec. 4, 2003

(65) Prior Publication Data

US 2004/0110889 A1 Jun. 10, 2004

(30) Foreign Application Priority Data

Dec. 4, 2002 (JP) .............................. 2002-352996
Dec. 4, 2002 (JP) .............................. 2002-352997

(51) Int. Cl.
C08K 3/34 (2006.01)
C08K 3/36 (2006.01)

(52) U.S. Cl. ........................ 524/492; 524/493; 524/368
(58) Field of Classification Search ................ 524/492, 524/493, 368
See application file for complete search history.

(56) References Cited

U.S. PATENT DOCUMENTS

| | | | | |
|---|---|---|---|---|
| 5,115,021 A * | 5/1992 | Blythe et al. ................... 525/84 |
| 5,396,940 A | 3/1995 | Segatta et al. |
| 5,489,628 A | 2/1996 | Sandstrom |
| 5,569,690 A * | 10/1996 | Terakawa et al. ............ 524/251 |
| 5,622,998 A * | 4/1997 | Tanaka et al. ................. 521/41 |
| 6,239,253 B1 * | 5/2001 | Tanaka et al. ................. 528/494 |
| 6,646,066 B2 * | 11/2003 | Hahn et al. ................... 525/539 |
| 6,797,783 B1 * | 9/2004 | Tanaka et al. ................ 525/315 |
| 2001/0009932 A1 | 7/2001 | Garro et al. |
| 2002/0040086 A1 * | 4/2002 | Yagi et al. .................... 524/445 |
| 2003/0092801 A1 * | 5/2003 | Agostini et al. .............. 524/27 |
| 2003/0105212 A1 * | 6/2003 | Lukich et al. ............... 524/492 |
| 2004/0226643 A1 * | 11/2004 | Yagi et al. ................... 152/510 |
| 2004/0266937 A1 * | 12/2004 | Yagi et al. ................... 524/493 |
| 2005/0209390 A1 * | 9/2005 | Yagi et al. ................... 524/493 |

FOREIGN PATENT DOCUMENTS

| | | |
|---|---|---|
| EP | 0351054 A | 1/1990 |
| GB | 2179355 A | 3/1987 |
| JP | 2-43233 A | 2/1990 |
| JP | 3-252431 A | 11/1991 |
| JP | 06 220254 A | 8/1994 |
| JP | 6-329702 A | 11/1994 |
| JP | 6-329838 A | 11/1994 |
| JP | 06329702 A | 11/1994 |
| JP | 07 090123 A | 4/1995 |
| JP | 9-118785 A | 5/1997 |
| JP | 09249716 | 9/1997 |
| JP | 2000-109612 A | 4/2000 |
| JP | 2001-139603 A | 5/2001 |
| JP | 2002060714 A | 2/2002 |

OTHER PUBLICATIONS

Machine Translation of JP 2002-060714 (pp. 1-9).*
Machine Translation of JP 06-329702 (pp. 1-11).*
Machine Translation of JP 07-090123 (pp. 1-7).*
Tho et al., "A Comparative Study of Styrene Polymerization in Deproteinized and Underproteinized Natural Rubber Latex", Rubber Chemistry and Technology, Rubber Division ACS. Akron, US, vol. 75, No. 1, Mar. 2002, pp. 111-118, XP001144957 ISSN: 0035-9475.
Naturruber Natural Rubber Newsletter of the Rubber Foundation Information Center for Natural Rubber, 4th Quarter 2002, No. 28, 2002 pp. 1-20, XP-002270172, The Netherlands ISSN: 1384-9352.

* cited by examiner

Primary Examiner—Kriellion A Sanders
(74) Attorney, Agent, or Firm—Birch, Stewart, Kolasch & Birch, LLP

(57) ABSTRACT

The present invention provides a rubber composition for a tire tread comprising 100 parts by weight of a rubber component containing at least 5% by weight of natural rubber graft-copolymerized with an organic compound having an unsaturated bond and!or epoxidized natural rubber, and 5 to 150 parts by weight of carbon black and!or silica with a nitrogen-absorbing specific surface are of 100 to 300m$^2$/g.

10 Claims, No Drawings

EPOXIDIZED OR GRAFT-COPOLYMERIZED NATURAL RUBBER COMPOSITION FOR TIRE TREAD AND PNEUMATIC TIRE USING THE SAME

This Nonprovisional application claims priority under 35 U.S.C. § 119(a) on patent application No(s). 2002-352996 and 2002-352997 filed in JAPAN on Dec. 4, 2002, the entire contents of which are hereby incorporated by reference.

BACKGROUND OF THE INVENTION

The present invention relates to a rubber composition for a tire tread and a pneumatic tire comprising the rubber composition, more specifically a rubber composition for a tire tread, which is excellent in abrasion resistance, fuel efficiency and wet grip performance, and a pneumatic tire comprising the rubber composition.

Natural rubber has excellent raw rubber strength (green strength) compared to synthetic rubber and is excellent in processability. Also, natural rubber has high mechanical strength and excellent abrasion resistance as vulcanized rubber and therefore is frequently used in large tires such as truck/bus tires. However, because natural rubber only has methyl groups with a small molecular weight in the side chains and has a low glass transition temperature (Tg) of −50° C., grip performance is poor. For this reason, diene synthetic rubber is frequently used in automobile tires.

In recent years, concern is rising over rise in oil prices and exhaustion of oil due to problems of supply. Also, from the viewpoint of environmental problems such as tightening regulations for resource conservation and prevention of carbon dioxide exhaust, natural resources are being reconsidered. The tire industry is not an exception and as an alternative material of synthetic rubber, natural rubber is attracting attention again. In order to use natural rubber as an alternative material of synthetic rubber, improving fuel efficiency and grip performance without losing the excellent properties of natural rubber is an urgent task.

Conventionally, carbon black is used as a rubber reinforcing agent. However, in recent years, in view of social demands for energy and resource conservation, particularly to economize fuel consumption of automobiles, low heat generating properties in a rubber composition are also in demand. In order to decrease heat generating properties in a rubber composition, filling with a small amount of carbon black or using carbon black with a large particle size can be considered, but there is the problem that reinforcement properties and abrasion resistance decrease.

To solve this problem, the method of using silica as a filler to decrease heat generating properties in a rubber composition is known and up to the present, many patent applications have been filed regarding such a method (JP-A-3-252431). However, particles of silica tend to coagulate due to hydrogen bonds of silanol groups, which are surface functional groups. As a result, there are problems such as dipersability of the silica in rubber becomes low, the Mooney viscosity becomes high and processability, for example when extruding, is poor.

To solve this problem, a silane coupling agent is developed. The silane coupling agent bonds with the silanol groups and prevents coagulation of silica, improving processability. Also, in terms of performance, as a result of the silane coupling agent chemically bonding with silica and the polymer, rolling resistance is thought to decrease and abrasion resistance is thought to improve. In order to achieve such goals, silica and the silane coupling agent must be chemically reacted during kneading and thoroughly kneading at a high temperature is considered to be favorable to sufficiently react silica and the silane coupling agent. However, the functional group portion of the silane coupling agent, which reacts with rubber, reacts with some of the rubber due to the temperature during processing such as kneading and the phenomenon of scorching known as gelation occurs. When kneading is conducted at a low temperature at which scorching does not occur, the reaction of silica and the silane coupling agent is insufficient.

As another prior art, compounding a plasticizer, obtained by depolymerizing deproteinized natural rubber, to a rubber product in order to decrease the hysteresis loss of the rubber component is known (JP-A-9-249716). However, in a tire, improvement is desired in fuel efficiency and wet grip performance, without decreasing properties such as processability and mechanical strength.

Also, as a method for preparing modified natural rubber, which is modified with high efficiency, and providing modified natural rubber which does not cause allergies, known is the art relating to modified natural rubber, which is subjected to deproteinizing treatment and graft-copolymerization treatment with an organic compound having an unsaturated bond (Japanese Patent No. 3294903). However, an example of using such modified rubber as a rubber composition for a tire tread, with the purpose of improving fuel efficiency and wet grip performance, is not known.

SUMMARY OF THE INVENTION

The present invention aims to provide a rubber composition for a tire tread, which is excellent in abrasion resistance, fuel efficiency and wet grip performance, without losing properties such as processability and mechanical strength, and a pneumatic tire comprising the rubber composition.

The present invention relates to a rubber composition for a tire tread comprising 100 parts by weight of a rubber component containing at least 5% by weight of natural rubber graft-copolymerized with an organic compound having an unsaturated bond and/or epoxidized natural rubber, and 5 to 150 parts by weight of carbon black and/or silica with a nitrogen-absorbing specific surface area of 100 to 300 m$^2$/g.

In the rubber composition for a tire tread, a silane coupling agent is preferably contained in an amount of 1 to 20% by weight of the silica.

In the rubber composition for a tire tread, protein within the natural rubber is preferably contained in an amount of at most 0.10% by weight converted to nitrogen content.

In the rubber composition for a tire tread, the silane coupling agent preferably fulfills the following formula (1)

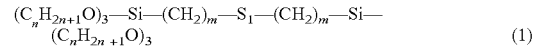

$$(C_nH_{2n+1}O)_3-Si-(CH_2)_m-S_l-(CH_2)_m-Si-(C_nH_{2n+1}O)_3 \qquad (1)$$

(in said formula (1), n is an integer of 1 to 3, m is an integer of 1 to 4, 1 is an integer of 2 to 8 and the average value of 1 is 2.1 to 3.5).

The present invention also relates to a pneumatic tire comprising the rubber composition as a tread.

DETAILED DESCRIPTION

The rubber composition for a tire tread of the present invention comprises modified natural rubber in the rubber component and a specific amount of carbon black and/or silica. The modified natural rubber in the rubber composition for a tire tread of the present invention is natural rubber graft-copolymerized with an organic compound having an unsaturated bond and/or epoxidized natural rubber.

When the modified natural rubber is natural rubber graft-copolymerized with an organic compound having an unsaturated bond, examples of the organic compound are a vinyl monomer, vinylidene monomer, vinyl aromatic monomer and vinylidene aromatic monomer. More specifically, examples are methacrylic acids and acrylic acids such as methacrylic acid, acrylic acid, methyl methacrylate, ethyl methacrylate, n-butyl methacrylate, i-butyl methacrylate, tert-butyl methacrylate, hexyl methacrylate, cyclohexyl methacrylate, octyl methacrylate, lauryl methacrylate, cetyl methacrylate, stearyl methacrylate, oleyl methacrylate, benzyl methacrylate, 2-hydroxyethyl methacrylate, 2-hydroxypropyl methacrylate, glycidyl methacrylate, glycerol methacrylate, methyl acrylate, ethyl acrylate, n-butyl acrylate, i-butyl acrylate, tert-butyl acrylate, hexyl acrylate, cyclohexyl acrylate, octyl acrylate, lauryl acrylate, cetyl acrylate, stearyl acrylate, oleyl acrylate, benzyl acrylate, 2-hydroxyethyl acrylate, 2-hydroxypropyl acrylate, glycidyl acrylate and glycerol methacrylate and derivatives thereof, acrylonitrile, vinyl acetate, acrylamide, styrene, α-methylstyrene and vinyl pyrrolidone. Also, a reactive monomer having at least two vinyl groups within a molecule can be used. Examples of a monomer having at least two vinyl groups within a molecule are a difunctional acrylic monomer such as allyl methacrylate, glycerol dimethacrylate, 1,3-butanediol dimethacrylate, ethylene glycol dimethacrylate, triethylene glycol dimethacrylate and tetraethylene glycol diacrylate, and a difunctional vinyl monomer such as divinylbenzene. Of these, from the viewpoint that reactivity of the monomer is excellent, styrene, methyl methacrylate, methyl acrylate and acrylonitrile are suitably used.

The graft polymerization reaction in the present invention can be conducted in any of the conditions of a latex, a natural rubber solution or solid rubber. Of these, in view of cost and ease in handling, polymerization is preferably conducted in a latex. When polymerizing in a latex, the natural rubber latex used is not particularly limited and either of commercially available ammonia treated latex or field latex may be used. When polymerizing in a solution, the organic solvent used is not limited as long as the solvent itself does not react with the natural rubber. For example, aromatic hydrocarbon such as benzene, chlorobenzene, toluene and xylene, aliphatic hydrocarbon such as n-heptane, n-hexane, n-pentane and n-octane and alicyclic hydrocarbon such as cyclohexane, methylcyclohexane, tetralin and decalin can suitably be used. Also, methylene chloride and tetrahydrofurane can be used. When polymerizing in solid rubber, the rubber can be modified by directly kneading with a roll or extrusion kneader.

The polymerization initiator used in graft-copolymerization is not particularly limited as long as it is a polymerization initiator usually used in radical polymerization. Examples are peroxides such as hydrogen peroxide, cumene hydroperoxide, tert-butyl hydroperoxide, di-tert-butylperoxide, dicumyl peroxide, benzoyl peroxide, acetyl peroxide, lauroyl peroxide, 2,2-azobisisobutyronitrile, potassium persulfate and ammonium persulfate. Of these, cumene hydroperoxide, tert-butyl hydroperoxide, benzoyl peroxide, 2,2-azobisisobutyronitrile and ammonium persulfate are suitably used.

When the polymerization initiator is used in a latex or a solution, the polymerization temperature is 40 to 120° C., preferably 40 to 80° C. When the temperature is too low, the graft-copolymerization reaction progresses slowly and when the temperature is too high, the polymer gelates, thus being unfavorable.

Also, in the graft-copolymerization reaction, a redox-type initiator can be used. When a redox-type initiator is used, the reaction temperature can be lowered and as a result, gelation of the polymer can be prevented. When a redox-type initiator is used, the polymerization temperature is −10 to 40° C., preferably 20 to 40° C.

In a water-soluble redox, examples of an oxidant are peroxides such as persulfate, hydrogen peroxide and hydroperoxide and as a water-soluble inorganic reducing agent, $Fe^{2+}$ salt or sodium bisulfite ($NaHSO_3$) and as an organic reducing agent, alcohol or polyamine can be combined. In a nonaqueous redox, hydroperoxide, dialkyl peroxide or diallyl peroxide is used as the oxidant and tertiary amine, naphthenic acid salt, mercaptan or an organic metal compound [such as $Al(C_2H_5)_3$, $B(C_2H_5)_3$, $Zn(C_2H_5)_2$] is used as the reducing agent. Examples of combinations are hydrogen peroxide and $Fe^{2+}$ salt, persulfate and sodium sulfite, cumene hydroperoxide and $Fe^{2+}$ salt, benzoyl peroxide and dimethyl aniline, tert-butyl hydroperoxide and tetraethylene pentamine and potassium persulfate and sodium sulfite.

The reaction time of graft-copolymerization in a latex or a solution is preferably 2 to 10 hours.

When graft-copolymerizing an organic compound having an unsaturated bond in a latex, the organic compound can be added to a latex in which an emulsifier is already added or the organic compound can be emulsified and then added to the latex. Examples of the emulsifier are not particularly limited and anionic surfactants such as metal salt or ammonium salt of fatty acid, alkyl benzene sulfonic acid or alkyl sulfate and amphoteric surfactants such as alkylamine salt and quaternary ammonium salt can suitably be used.

The amount of the organic compound having an unsaturated bond is 5 to 100% by weight, preferably 5 to 80% by weight, more preferably 5 to 60% by weight, most preferably 5 to 40% by weight of the amount of natural rubber (as solid content). When the amount of the organic compound is more than 100% by weight, development of homopolymers increases and graft efficiency decreases, thus being unfavorable. Also, when the amount of the organic compound is less than 5% by weight, the graft amount becomes small and the effects of modifying become small, thus being unfavorable.

When the modified natural rubber is natural rubber graft-copolymerized with an organic compound having an unsaturated bond, the graft ratio thereof is preferably 5 to 50% by weight. When the graft ratio is less than 5% by weight, the effects of modifying tend not be obtained and when the graft ratio is more than 50% by weight, abrasion resistance tends to decrease. Herein, graft ratio is calculated by finding, from NMR measurement data, area strength A of methine protons derived from natural rubber near 5.10 ppm and area strength B of protons derived from styrene phenyl groups near 7 ppm and then finding the styrene content (area strength B/(area strength A+area strength B)). Thereafter, using the obtained styrene content, the graft ratio is calculated from the following equation.

$$\text{Graft ratio (\%)} = \frac{\text{Styrene Content} \times \text{Total Polymer Weight after Polymerization (g)}}{\text{Weight of Rubber Added (g)}} \times 100$$

When the modified natural rubber is epoxidized natural rubber, epoxidization is conducted using organic peracid.

Examples of the organic peracid are perbenzoic acid, peracetic acid, performic acid, perphthalic acid, perpropionic acid, trifluoro peracetic acid and perbutyric acid. These organic peracids maybe added directly to the latex or the two components which form organic peracid may be added to the latex to produce organic peracid in the latex. When producing organic peracid in the latex, for example, glacial acetic acid and hydrogen peroxide are sequentially added to produce peracetic acid.

The amount of the organic peracid is 5 to 100% by weight, preferably 10 to 80% by weight of the amount of natural rubber (as solid content). When the amount of the organic peracid is more than 100% by weight, properties decrease by side reactions and when the amount is less than 5% by weight, the effects of modifying are not obtained, thus being unfavorable.

As the reaction conditions for the epoxidizing reaction, reaction is preferably conducted at 25 to 60° C. for 2 to 24 hours.

When the modified natural rubber is epoxidized natural rubber, the epoxidization degree is preferably 5 to 85%. When the epoxidization degree is less than 5% by weight, the effects of epoxidizing may not sufficiently be obtained and when the epoxidization degree is more than 85%, processability and fuel efficiency tend to decrease. Herein, the epoxidization degree (%) is calculated by finding, from NMR measurement data, area strength A of methine protons derived from natural rubber near 5.10 ppm and area strength C of protons derived from epoxy groups near 2.7 ppm and then finding the epoxidization degree (%) from the following equation.

$$\text{Epoxidization degree (\%)} = \frac{\text{Area Strength } C}{\text{Area Strength } A + \text{Area Strength } C} \times 100$$

Examples of the modified natural rubber used in the present invention are natural rubber graft-copolymerized with an organic compound having an unsaturated bond and/or epoxidized natural rubber. Of these, the modified natural rubber used in the present invention is preferably graft-copolymerized natural rubber, from the viewpoint of achieving both fuel efficiency and wet grip properties.

In the usual natural rubber latex, approximately 5 to 10% by weight of non-rubber components such as protein are present. These non-rubber components, particularly protein, inhibit the modification of natural rubber and for example, in the case of a graft-copolymer, problems occur such as the graft ratio and graft efficiency decrease and high effects of modifying cannot be obtained.

As the modified natural rubber of the present invention, natural rubber, wherein the protein in the natural rubber is reduced to at most 0.10% by weight converted to nitrogen content, is preferably used. By modifying using natural rubber deproteinized to a nitrogen content of at most 0.10% by weight (hereinafter, may be referred to as deproteinized natural rubber), natural rubber can be efficiently modified and high effects of modifying can be obtained. In modified natural rubber, the amount of protein is preferably at most 0.05% by weight, more preferably at least 0.03% by weight converted to nitrogen content. Natural rubber wherein the nitrogen content is reduced to at most 0.03% by weight is considered to be almost completely free of protein.

Deproteinized natural rubber can be prepared by the method of decomposing protein by adding a protein-decomposing enzyme or bacteria to the latex and/or the method of repeatedly washing with a surfactant such as soap.

The protein-decomposing enzyme is not particularly limited and can be an enzyme derived from bacteria, filamentous bacteria or yeast. Of these, protease derived from bacteria is preferably used.

As the surfactant, an anionic surfactant and/or a nonionic surfactant can be used. Examples of the anionic surfactant are carboxylic acid types, sulfonic acid types, sulfuric ester types and phosphoric ester types. As the nonionic surfactant, polyoxyalkylene ether types, polyoxyalkylene ester types, polyol fatty acid ester types, sugar fatty acid ester types and alkyl polyglycoxide can be suitably be used.

In order to decompose protein within the natural rubber latex with the protein-decomposing enzyme, the protein-decomposing enzyme is preferably added in a proportion of approximately 0.001 to 10% by weight of the amount of the field latex or ammonia treated latex (as solid content). The time of treatment by the enzyme is not particularly limited but treatment is preferably conducted for approximately a few minutes to one week. Also, the latex can be stirred or left still. Also, the temperature may be adjusted if necessary and the suitable temperature is 5 to 90° C., preferably 20 to 60° C. When the treatment temperature is higher than 90° C., the enzyme is quickly deactivated and when the temperature is lower than 5° C., the enzyme reaction has difficulty progressing.

The method for washing the latex particles with a surfactant can be either the method of washing latex, which is not enzyme-treated, or the method of washing enzyme-treated latex.

The surfactant is preferably added within the range of 0.001 to 15% by weight, particularly 0.001 to 10% by weight, of the amount of the latex (as solid content). As the washing method, there are the method of adding the surfactant to latex, which is not enzyme-treated, or enzyme-treated latex and then centrifuging and the method of separating by coagulating the latex particles. In the case of washing latex by centrifuging, centrifugation can be conducted once or several times. Also, when washing natural rubber, synthetic rubber or synthetic latex can be used in combination.

The rubber composition for a tire tread of the present invention contains at least 5% by weight, preferably at least 10% by weight, of modified natural rubber in the rubber component. When the modified natural rubber in the rubber component is less than 5% by weight, the effects of adding modified natural rubber are small, thus being unfavorable. Because the rubber composition for a tire tread of the present invention contains at least 5% by weight of modified natural rubber in the rubber component, when used in a tire tread, a pneumatic tire, which is excellent in fuel efficiency and wet grip performance, can be obtained without losing properties such as processability and mechanical strength.

As the rubber component other than modified natural rubber used in the present invention, a rubber component comprising natural rubber and/or diene synthetic rubber is used. Examples of the diene synthetic rubber used in the present invention are styrene-butadiene rubber (SBR), butadiene rubber (BR), isoprene rubber (IR), ethylene-propylene-diene rubber (EPDM), chloroprene rubber (CR), acrylonitrile-butadiene rubber (NBR) and butyl rubber (IIR). These rubbers may be used alone or two or more kinds may be combined.

The rubber composition of the present invention contains carbon black and/or silica.

The carbon black used in the present invention preferably has a nitrogen-absorbing specific surface area ($N_2SA$) of 70 to 300 m²/g, more preferably 90 to 250 m²/g. When the N₂SA of carbon black is less than 70 m²/g, obtaining sufficient reinforcing properties and abrasion resistance is difficult and when the N₂SA is more than 300 m²/g, dispersability decreases and heat generating properties increase, thus being unfavorable. Examples of the carbon black are HAF, ISAF and SAF, but are not particularly limited.

The amount of carbon black contained in the rubber composition of the present invention is 5 to 150 parts by weight, preferably 10 to 120 parts by weight, more preferably 15 to 100 part by weight based on 100 parts by weight of the rubber component. When the amount of carbon black is less than 5 parts by weight, reinforcing properties and abrasion resistance decrease and when the amount is more than 150 parts by weight, not only does dispersability decrease but also the desired properties cannot be obtained, thus being unfavorable.

Usually, an example of silica is silica prepared by wet method or dry method but silica used in the present invention is not particularly limited.

The silica has a nitrogen-absorbing specific surface area (N₂SA) of 100 to 300 m²/g, preferably 130 to 280 m²/g. When the N₂SA of silica is less than 100 m²/g, the reinforcing effects are small and when the N₂SA of silica is more than 300 m²/g, dispersability decreases and heat generating properties of the rubber composition increase, thus being unfavorable.

The amount of silica is 5 to 150 parts by weight, preferably 10 to 120 parts by weight, more preferably 15 to 100 parts by weight based on 100 parts by weight of the rubber component. When the amount of silica is less than 5 parts by weight, low heating generating properties and wet grip performance cannot sufficiently be obtained and when the amount is more than 150 parts by weight, processability and workability decrease, thus being unfavorable.

To the rubber composition for a tire tread of the present invention, compounding agents usually used in the rubber industry other than modified natural rubber, rubber component, carbon black and silica, such as a filler, softening agent, antioxidant, vulcanizing agent, vulcanization accelerator and vulcanization accelerating aid can be compounded accordingly if necessary.

In the case that silica is added, a silane coupling agent is preferably added. The type of silane coupling agent is not particularly limited but a silane coupling agent represented by the following formula (1) can suitably be used.

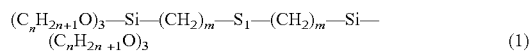

$$(C_nH_{2n+1}O)_3\text{—Si—}(CH_2)_m\text{—}S_l\text{—}(CH_2)_m\text{—Si—}(C_nH_{2n+1}O)_3 \quad (1)$$

In formula (1), n is an integer of 1 to 3, m is an integer of 1 to 4 and 1 is an integer of 2 to 8.

In formula (1), 1 represents the number of sulfur atoms in the polysulfide part and in the silane coupling agent, the average value of 1 is preferably 2.1 to 3.5. When the average value of 1 is less than 2.1, reactivity of the silane coupling agent and the rubber component tends to become poor and when the average value is more than 3.5, gelation may progress during processing.

Examples of the silane coupling agent are bis(3-triethoxysilylpropyl)polysulfide, bis(2-triethoxysilylethyl) polysulfide, bis(3-trimethoxysilylpropyl)polysulfide, bis(2-trimethoxysilylethyl)polysulfide, bis(4-triethoxysilylbutyl) polysulfide and bis(4-trimethoxysilylbutyl)polysulfide. Of these silane coupling agents, bis(3-triethoxysilylpropyl) polysulfide is suitably used from the viewpoint of achieving both the effects of adding the coupling agent and low cost. These silane coupling agents may be used alone or in a combination of two or more kinds.

The amount of the silane coupling agent is preferably 1 to 20% by weight of the weight of silica. When the amount of the silane coupling agent is less than 1% by weight, the effects of adding a silane coupling agent cannot be sufficiently obtained and when the amount is more than 20% by weight, cost becomes high, the coupling effect cannot be obtained and reinforcing properties and abrasion resistance decrease, thus being unfavorable. In view of the dispersion effect and coupling effect, the amount of the silane coupling agent is preferably 2 to 15% by weight of the weight of silica.

The rubber composition for a tire tread of the present invention is obtained by simultaneously kneading the rubber component and compounding agents such as carbon black and/or silica in the kneading step at a kneading temperature of 120 to 200° C. When the kneading temperature is a temperature lower than 120° C., sufficient properties cannot be obtained and when the temperature is higher than 200° C., the phenomenon of scorching occurs. More, preferably, the kneading temperature is 140 to 180° C.

The kneading time in the kneading step is preferably 4 to 15 minutes. When the kneading time is less than 4 minutes, dispersion of compounding agents such as carbon black and/or silica tends to be insufficient. When the kneading time is more than 15 minutes, the molecular weight of the rubber component becomes low and sufficient properties cannot be obtained, thus being unfavorable.

The pneumatic tire of the present invention has a tread comprising the rubber composition. The pneumatic tire can be prepared by the usual method for preparing a pneumatic tire. That is, the rubber composition is extrusion processed in the shape of a tire tread in an unvulcanized state and then laminated by the usual method on a tire forming machine to form an unvulcanized tire. The unvulcanized tire obtained in this way is heated and pressurized in a vulcanizer to obtain a pneumatic tire. The pneumatic tire obtained in this way is excellent in abrasion resistance, fuel efficiency and wet grip properties, as a result of containing modified natural rubber in the tread.

Hereinafter, the present invention is explained in detail by means of Examples, but the present invention is not limited thereto.

The various compounding agents used in Examples and Comparative Examples as the material for rubber are described below.

Natural Rubber (NR): RSS #3
SBR: SBR1502 (amount of styrene units: 23.5% by weight) available from JSR Corporation
HANR: High ammonia-type natural rubber latex Hytex available from Nomura Trading Co., Ltd.
Polymers 1 to 7: The process for preparing and analysis of each polymer are described below.
Carbon black: SHOWBLACK N220 available from Showa Cabot Co. Ltd. (N₂SA: 125 m²/g)
Silica: Ultrasil VN3 available from Degussa Co. (N₂SA: 210 m²/g)
Silane coupling agent A: Si69 (bis(3-triethoxysilylpropyl) tetrasulfide) available from Degussa Co. (average value of 1: 3.8)
Silane coupling agent B: Si266 (bis(3-triethoxysilylpropyl) disulfide) available from Degussa Co. (average value of 1: 2.2)
Antioxidant: NOCRAC 6C (N-(1,3-dimethylbutyl)-N'-phenyl-p-phenylenediamine) available from Ouchi Shinko Chemical Industrial Co., Ltd.

Stearic Acid: Stearic acid available from NOF Corporation

Zinc oxide: Zinc Oxide type 1 available from Mitsui Mining and Smelting Co., Ltd.

Sulfur: powdery sulfur available from Tsurumi Chemicals Co., Ltd. Vulcanization Accelerator TBBS: Nocceler NS (N-tert-butyl-2-benzothiazylsufenamide), available from Ouchi Shinko Chemical Industrial Co., Ltd.

Vulcanization Accelerator DPG: Nocceler D (N,N'-diphenyl guanidine), available from Ouchi Shinko Chemical Industrial Co., Ltd.

Process for Preparing Polymers 1 to 7

Polymer 1

A high ammonia type natural rubber latex (solid content 60.2%) available from Guthrie Bhd. (Malaysia) was used. The natural rubber latex was diluted so that the solid rubber content became 10% and stabilized with a 0.12% sodium naphthenate solution. The pH thereof was adjusted to 9.2 using sodium dihydrogen phosphate and then Alcalase 2.0 M was added in a proportion of 0.78 g based on 10 g of the solid rubber content. Furthermore, after adjusting the pH to 9.2 again, the latex was maintained at 37° C. for 24 hours.

A 1% aqueous solution of Emulgen 810 (available from Kao Corporation) which is an nonionic surfactant was added to the latex in which enzyme treatment was completed and after the rubber concentration was adjusted to 8%, centrifugation was conducted for 30 minutes at 11,000 rpm. The obtained creamy fraction was dispersed in a 1% aqueous solution of Emulgen 810 and after the rubber concentration was adjusted to approximately 8%, centrifugation was conducted again. After this process was repeated once more, the obtained creamy fraction was dispersed in distilled water to prepare deproteinized rubber latex with a solid rubber content of 60% (Polymer 1).

Polymer 2

A 500 ml four-necked flask equipped with a stirring rod, a dropping funnel, a nitrogen introducing pipe and a condenser was charged with 150 g of high ammonia type natural rubber latex (available from Nomura Trading Co., Ltd., Hytex) (solid content 60%) and the latex was diluted with distilled water until the solid content became 30%. While stirring in a nitrogen atmosphere, 0.45 g of a 10% by weight aqueous solution of anionic surfactant Emulgen E70C (available from Kao Corporation) and 0.6 g of a 70% aqueous solution of polymerization initiator tert-butyl hydroperoxide were added. Then, 9.0 g of styrene was slowly dropped. After dropping, 0.88 g of tetraethylene pentamine was added and the reaction was conducted at 30° C. for 3 hours to obtain modified natural rubber latex in which styrene is graft-copolymerized (Polymer 2).

Polymer 3

Modified natural rubber latex in which styrene is graft-copolymerized (Polymer 3) was obtained in the same manner as Polymer 2, except that the amount of styrene was 18 g.

Polymer 4

Modified natural rubber latex in which styrene is graft-copolymerized (Polymer 4) was obtained in the same manner as Polymer 2, except that the latex was the deprotienized natural rubber latex prepared in Polymer 1.

Polymer 5

Modified natural rubber latex in which styrene is graft-copolymerized (Polymer 5) was obtained in the same manner as Polymer 2, except that the latex was the deprotienized natural rubber latex prepared in Polymer 1 and the amount of styrene was 18 g.

Polymer 6

A three-necked flask equipped with a stirring rod, a dropping funnel and a condenser was charged with 100 g of the same high ammonia type natural rubber latex as in Polymer 3 and the latex was diluted with distilled water until the solid content became 30%. Then, 0.6 g of a 10% by weight aqueous solution of anionic surfactant Emulgen E70C was added to stabilize the latex. While the pH of the latex was adjusted with 2.8% ammonia water to maintain a pH of 5 to 6, 88.2 g of peracetic acid of 2.5 mol/l (16.77 g as peracetic acid) was slowly dropped. After dropping, the latex was left at 30° C. for 1 day to advance the epoxidization reaction and epoxidized modified natural rubber latex (Polymer 6) was obtained.

Polymer 7

Epoxidized modified natural rubber latex (Polymer 7) was obtained in the same manner as Polymer 6, except that the latex was the deprotienized natural rubber latex prepared in Polymer 1.

Preparation of Samples for Analysis

The Polymer latex 1 to 7 obtained respectively and the HANR were flow casted on a glass board and after drying at room temperature, were dried under reduced pressure. After drying, Polymers 1 to 5 and HANR were extracted with a mixed solvent of acetone and 2-butanone (3:1) the other Polymers were extracted with acetone and impurities such as homopolymers were removed. With respect to the obtained samples, the following analyses were conducted.

(Nitrogen Content)

The nitrogen content (% by weight) was measured by the Kjeldahl testing method.

(IR)

The infrared absorption spectrum was measured using a Fourier transform infrared spectrometer made by PerkinElmer, Inc. Respectively, Polymers 2 to 5 were confirmed to be natural rubber in which styrene was graft-copolymerized and Polymers 6 and 7 were confirmed to be epoxidized natural rubber.

($^1$H-NMR)

$^1$H-NMR was measured using a $^1$H-NMR device made by JEOL Ltd. Chloroform-d1 was used as the measurement solvent. From the measurement results of $^1$H-NMR, the "graft ratio", "graft efficiency" and "epoxidization degree" described below were respectively found.

(Graft Ratio)

The graft ratio was calculated by finding, from NMR measurement data, area strength A of methine protons derived from natural rubber near 5.10 ppm and area strength B of protons derived from styrene phenyl groups near 7 ppm and then finding the styrene content (area strength B/(area strength A+area strength B)). Thereafter, using the obtained styrene content, the graft ratio (% by weight) was calculated from the following equation.

$$\text{Graft ratio (\%)} = \frac{\text{Styrene Content} \times \text{Total Polymer Weight after Polymerization (g)}}{\text{Weight of Rubber Added (g)}} \times 100$$

(Graft Efficiency)

The graft efficiency (% by weight) was found from the following equation.

$$\text{Graft Efficiency (\%)} = \frac{\text{Total Polymer Weight of Graft Polymerized Monomers (g)}}{\text{Total Weight of Polymerized Monomers (g)}} \times 100$$

(Epoxidization Degree)

The epoxidization degree (%) was calculated by finding, from NMR measurement data, area strength A of methine protons derived from natural rubber near 5.10 ppm and area strength C of protons derived from epoxy groups near 2.7 ppm and then finding the epoxidization degree (%) from the following equation.

$$\text{Epoxidization Degree (\%)} = \frac{\text{Area Strength } C}{\text{Area Strength } A + \text{Area Strength } C} \times 100$$

The analysis results of Polymers 1 to 7 and HANR are shown in Table 1.

TABLE 1

|  | Nitrogen Content (% by weight) | Graft Ratio (% by weight) | Graft Efficiency (% by weight) | Epoxidization Degree (%) |
|---|---|---|---|---|
| HANR | 0.4 | — | — | — |
| Polymer 1 | 0.025 | — | — | — |
| Polymer 2 | 0.39 | 5.39 | 57.1 | — |
| Polymer 3 | 0.4 | 8.09 | 66.3 | — |
| Polymer 4 | 0.025 | 6.09 | 70.2 | — |
| Polymer 5 | 0.024 | 9.99 | 74.4 | — |
| Polymer 6 | 0.4 | — | — | 19.6 |
| Polymer 7 | 0.024 | — | — | 22.8 |

Preparation of Sample for Vulcanized Rubber

To each latex of Polymers 1 to 7 obtained by the above preparation method, formic acid or methanol was gradually added and after only the rubber component was coagulated, the rubber component was washed several times with distilled water and dried. The obtained dry substance was used as Polymers 1 to 7 in the each of the compositions of the following Examples/Comparative Examples.

Test Method (Processability)

The Mooney viscosity was measured at 130° C. according to the method for measuring Mooney viscosity defined in JIS K6300. The Mooney viscosity provided as the standard ($ML_{1+4}$) was assumed to be 100 and the processability index was represented by the following equation. The larger the index is the lower the Mooney viscosity, indicating excellent processability.

Processability Index=(Standard $ML_{1+4}$/$ML_{1+4}$ of Each Composition)×100

(Rolling Resistance)

The tan δ of each composition was measured under the conditions of a temperature of 70° C., an initial strain of 10% and a dynamic strain of 2% using a viscoelasticity spectrometer VES (made by Iwamoto Corporation). The tan δ provided as the standard was assumed to be 100 and the rolling resistance index was represented by the following equation. The larger the index is the lower the rolling resistance, indicating excellent rolling resistance.

Rolling Resistance Index=(Standard tan δ/tan δ of Each Composition)×100

(Abrasion Resistance Test)

The Lambourn abrasion amount was measured under conditions of a temperature of 20° C., a slip ratio of 20% and testing time of 5 minutes with a Lambourn abrasion tester and the volume loss of each composition was calculated. The standard amount of loss was assumed to be 100 and the abrasion resistance index was represented by the following equation. The abrasion resistance is indicated as being more superior the larger the index is.

Abrasion Resistance Index=(Standard Amount of Loss/Amount of Loss of Each Composition)×100

(Wet Skid Test)

The maximum friction coefficient was measured according to the method of ASTM E303-83 using a portable skid tester made by The Stanley London Division of The Munro Group. The measured value provided as the standard was assumed to be 100 and the wet skid performance index was represented by the following equation. The wet skid performance is indicated as being more superior the larger the index is.

Wet Skid Performance Index=(Value of Each Composition/Standard Value)×100

EXAMPLES 1 TO 6 AND COMPARATIVE EXAMPLES 1 TO 3

According to the composition formula shown in Table 2, the compounding agents other than sulfur and the vulcanization accelerator were mixed by kneading at 150° C. for 4 minutes. Then, sulfur and the vulcanization accelerator were added and mixed by kneading to obtain each sample rubber composition. The compositions were press vulcanized at 170° C. for 20 minutes to obtain vulcanized objects and with respect to the objects, each of the above tests of properties were conducted. In each test, Comparative Example 1 was assumed to be standard (100). The results are shown in Table 2.

TABLE 2

|  | Ex. | | | | | | Com. Ex. | | |
| --- | --- | --- | --- | --- | --- | --- | --- | --- | --- |
|  | 1 | 2 | 3 | 4 | 5 | 6 | 1 | 2 | 3 |
| Composition (parts by weight) | | | | | | | | | |
| NR | — | — | — | — | — | — | 30 | — | — |
| SBR | 70 | 70 | 70 | 70 | 70 | 70 | 70 | 70 | 70 |
| HANR | — | — | — | — | — | — | — | 30 | — |
| Polymer 1 | — | — | — | — | — | — | — | — | 30 |
| Polymer 2 | 30 | — | — | — | — | — | — | — | — |
| Polymer 3 | — | 30 | — | — | — | — | — | — | — |
| Polymer 4 | — | — | 30 | — | — | — | — | — | — |
| Polymer 5 | — | — | — | 30 | — | — | — | — | — |
| Polymer 6 | — | — | — | — | 30 | — | — | — | — |
| Polymer 7 | — | — | — | — | — | 30 | — | — | — |
| Carbon Black | 60 | 60 | 60 | 60 | 60 | 60 | 60 | 60 | 60 |
| Antioxidant | 1 | 1 | 1 | 1 | 1 | 1 | 1 | 1 | 1 |
| Stearic Acid | 2 | 2 | 2 | 2 | 2 | 2 | 2 | 2 | 2 |
| Zinc Oxide | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 |
| Vulcanization Accelerator TBBS | 1 | 1 | 1 | 1 | 1 | 1 | 1 | 1 | 1 |
| Vulcanization Accelerator DPS | — | — | — | — | — | — | — | — | — |
| Properties | | | | | | | | | |
| Processability | 101 | 100 | 102 | 101 | 100 | 100 | 100 | 98 | 100 |
| Rolling Resistance | 101 | 102 | 102 | 103 | 101 | 102 | 100 | 101 | 103 |
| Abrasion Resistance | 101 | 104 | 101 | 102 | 102 | 103 | 100 | 101 | 98 |
| Wet Skid Performance | 102 | 104 | 103 | 105 | 102 | 106 | 100 | 99 | 101 |

EXAMPLES 7 TO 12 AND COMPARATIVE EXAMPLES 4 TO 6

Each vulcanized object was obtained in the same manner as in Examples 1 to 6 and Comparative Examples 1 to 3 according to the composition shown in Table 3 and the tests were conducted in the same manner as in Examples 1 to 6 and Comparative Examples 1 to 3, except that Comparative Example 4 was assumed to be standard (100).

The results are shown in Table 3.

EXAMPLES 13 TO 16 AND COMPARATIVE EXAMPLES 7 TO 9

Each vulcanized object was obtained in the same manner as in Examples 1 to 6 and Comparative Examples 1 to 3 according to the composition shown in Table 4 and the tests were conducted in the same manner as in Examples 1 to 6 and Comparative Examples 1 to 3, except that Comparative Example 7 was assumed to be standard (100).

The results are shown in Table 4.

TABLE 3

|  | Ex. | | | | | | Com. Ex. | | |
| --- | --- | --- | --- | --- | --- | --- | --- | --- | --- |
|  | 7 | 8 | 9 | 10 | 11 | 12 | 4 | 5 | 6 |
| Composition (parts by weight) | | | | | | | | | |
| NR | — | — | — | — | — | — | 100 | — | — |
| HANR | — | — | — | — | — | — | — | 100 | — |
| Polymer 1 | — | — | — | — | — | — | — | — | 100 |
| Polymer 2 | 100 | — | — | — | — | — | — | — | — |
| Polymer 3 | — | 100 | — | — | — | — | — | — | — |
| Polymer 4 | — | — | 100 | — | — | — | — | — | — |
| Polymer 5 | — | — | — | 100 | — | — | — | — | — |
| Polymer 6 | — | — | — | — | 100 | — | — | — | — |
| Polymer 7 | — | — | — | — | — | 100 | — | — | — |
| Carbon Black | 60 | 60 | 60 | 60 | 60 | 60 | 60 | 60 | 60 |
| Antioxidant | 1 | 1 | 1 | 1 | 1 | 1 | 1 | 1 | 1 |
| Stearic Acid | 2 | 2 | 2 | 2 | 2 | 2 | 2 | 2 | 2 |
| Zinc Oxide | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 |
| Vulcanization Accelerator TBBS | 1 | 1 | 1 | 1 | 1 | 1 | 1 | 1 | 1 |
| Properties | | | | | | | | | |
| Processability | 102 | 101 | 103 | 102 | 102 | 100 | 100 | 101 | 103 |
| Rolling Resistance | 102 | 101 | 103 | 102 | 100 | 101 | 100 | 101 | 102 |
| Abrasion Resistance | 100 | 101 | 101 | 102 | 101 | 100 | 100 | 99 | 96 |
| Wet Skid Performance | 102 | 104 | 104 | 106 | 104 | 106 | 100 | 99 | 100 |

TABLE 4

|  | Ex. | | | | Com. Ex. | | |
| --- | --- | --- | --- | --- | --- | --- | --- |
|  | 13 | 14 | 15 | 16 | 7 | 8 | 9 |
| Composition (parts by weight) | | | | | | | |
| SBR | 70 | 70 | 70 | 70 | 70 | 70 | 70 |
| NR | — | — | — | — | 30 | — | — |
| HANR | — | — | — | — | — | 30 | — |
| Polymer 1 | — | — | — | — | — | — | 30 |
| Polymer 2 | 30 | — | — | — | — | — | — |
| Polymer 3 | — | 30 | — | — | — | — | — |
| Polymer 4 | — | — | 30 | — | — | — | — |
| Polymer 5 | — | — | — | 30 | — | — | — |
| Silica | 50 | 50 | 50 | 50 | 50 | 50 | 50 |
| Silane Coupling Agent A | 5 | 5 | 5 | 5 | 5 | 5 | 5 |
| Silane Coupling Agent B | — | — | — | — | — | — | — |
| Antioxidant | 1 | 1 | 1 | 1 | 1 | 1 | 1 |
| Stearic Acid | 2 | 2 | 2 | 2 | 2 | 2 | 2 |
| Zinc Oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization Accelerator TBBS | 1 | 1 | 1 | 1 | 1 | 1 | 1 |
| Vulcanization Accelerator DPG | 0.5 | 0.5 | 0.5 | 0.5 | 0.5 | 0.5 | 0.5 |
| Properties | | | | | | | |
| Processability | 102 | 101 | 104 | 103 | 100 | 103 | 105 |
| Rolling Resistance | 103 | 102 | 105 | 104 | 100 | 101 | 102 |
| Abrasion Resistance | 101 | 102 | 100 | 101 | 100 | 100 | 97 |
| Wet Skid Performance | 102 | 104 | 103 | 106 | 100 | 99 | 100 |

EXAMPLES 17 TO 20 AND COMPARATIVE EXAMPLES 10 TO 12

Each vulcanized object was obtained in the same manner as in Examples 1 to 6 and Comparative Examples 1 to 3 according to the composition shown in Table 5 and the tests were conducted in the same manner as in Examples 1 to 6 and Comparative Examples 1 to 3, except that Comparative Example 10 was assumed to be standard (100).

The results are shown in Table 5.

TABLE 5

|  | Ex. | | | | Com. Ex. | | |
| --- | --- | --- | --- | --- | --- | --- | --- |
|  | 17 | 18 | 19 | 20 | 10 | 11 | 12 |
| Composition (parts by weight) | | | | | | | |
| NR | — | — | — | — | 100 | — | — |
| HANR | — | — | — | — | — | 100 | — |
| Polymer 1 | — | — | — | — | — | — | 100 |
| Polymer 2 | 100 | — | — | — | — | — | — |
| Polymer 3 | — | 100 | — | — | — | — | — |
| Polymer 4 | — | — | 100 | — | — | — | — |
| Polymer 5 | — | — | — | 100 | — | — | — |
| Silica | 50 | 50 | 50 | 50 | 50 | 50 | 50 |
| Silane Coupling Agent A | 5 | 5 | 5 | 5 | 5 | 5 | 5 |
| Silane Coupling Agent B | — | — | — | — | — | — | — |
| Antioxidant | 1 | 1 | 1 | 1 | 1 | 1 | 1 |
| Stearic Acid | 2 | 2 | 2 | 2 | 2 | 2 | 2 |
| Zinc Oxide | 3 | 3 | 3 | 3 | 3 | 3 | 3 |
| Sulfur | 2 | 2 | 2 | 2 | 1.5 | 2 | 2 |
| Vulcanization Accelerator TBBS | 1 | 1 | 1 | 1 | 1 | 1 | 1 |
| Vulcanization Accelerator DPG | 0.5 | 0.5 | 0.5 | 0.5 | 0.5 | 0.5 | 0.5 |
| Properties | | | | | | | |
| Processability | 103 | 102 | 104 | 103 | 100 | 102 | 104 |
| Rolling Resistance | 103 | 102 | 105 | 104 | 100 | 101 | 103 |

TABLE 5-continued

|  | Ex. | | | | Com. Ex. | | |
| --- | --- | --- | --- | --- | --- | --- | --- |
|  | 17 | 18 | 19 | 20 | 10 | 11 | 12 |
| Abrasion Resistance | 102 | 103 | 101 | 102 | 100 | 100 | 96 |
| Wet Grip Performance | 104 | 106 | 106 | 108 | 100 | 99 | 101 |

EXAMPLES 21 TO 24 AND COMPARATIVE EXAMPLES 13 TO 15

Each vulcanized object was obtained in the same manner as in Examples 1 to 6 and Comparative Examples 1 to 3 according to the composition shown in Table 6 and the tests were conducted in the same manner as in Examples 1 to 6 and Comparative Examples 1 to 3, except that Comparative Example 13 was assumed to be standard (100).

The results are shown in Table 6.

TABLE 6

|  | Ex. | | | | Com. Ex. | | | |
| --- | --- | --- | --- | --- | --- | --- | --- | --- |
|  | 21 | 22 | 23 | 24 | 13 | 7 | 14 | 15 |
| Composition (parts by weight) | | | | | | | | |
| SBR | 70 | 70 | 70 | 70 | 70 | 70 | 70 | 70 |
| NR | — | — | — | — | 30 | 30 | — | — |
| HANR | — | — | — | — | — | — | 30 | — |
| Polymer 1 | — | — | — | — | — | — | — | 30 |
| Polymer 2 | 30 | — | — | — | — | — | — | — |
| Polymer 3 | — | 30 | — | — | — | — | — | — |
| Polymer 4 | — | — | 30 | — | — | — | — | — |
| Polymer 5 | — | — | — | 30 | — | — | — | — |
| Silica | 50 | 50 | 50 | 50 | 50 | 50 | 50 | 50 |
| Silane Coupling Agent A | — | — | — | — | — | 5 | — | — |
| Silane Coupling Agent B | 5 | 5 | 5 | 5 | 5 | — | 5 | 5 |
| Antioxidant | 1 | 1 | 1 | 1 | 1 | 1 | 1 | 1 |
| Stearic Acid | 2 | 2 | 2 | 2 | 2 | 2 | 2 | 2 |
| Zinc Oxide | 3 | 3 | 3 | 3 | 3 | 3 | 3 | 3 |
| Sulfur | 1.7 | 1.7 | 1.7 | 1.7 | 1.7 | 1.5 | 1.7 | 1.7 |
| Vulcanization Accelerator TBBS | 1 | 1 | 1 | 1 | 1 | 1 | 1 | 1 |
| Vulcanization Accelerator DPG | 0.5 | 0.5 | 0.5 | 0.5 | 0.5 | 0.5 | 0.5 | 0.5 |
| Properties | | | | | | | | |
| Processability | 102 | 101 | 105 | 103 | 100 | 94 | 102 | 104 |
| Rolling Resistance | 102 | 101 | 105 | 104 | 100 | 101 | 101 | 102 |
| Abrasion Resistance | 101 | 102 | 101 | 102 | 100 | 100 | 100 | 97 |
| Wet Skid Performance | 102 | 104 | 103 | 106 | 100 | 101 | 99 | 100 |

EXAMPLES 25 TO 28 AND COMPARATIVE EXAMPLES 16 TO 18

Each vulcanized object was obtained in the same manner as in Examples 1 to 6 and Comparative Examples 1 to 3 according to the composition shown in Table 7 and the tests were conducted in the same manner as in Examples 1 to 6 and Comparative Examples 1 to 3, except that Comparative Example 16 was assumed to be standard (100).

The results are shown in Table 7.

TABLE 7

|  | Ex. | | | | Com. Ex. | | | |
| --- | --- | --- | --- | --- | --- | --- | --- | --- |
|  | 25 | 26 | 27 | 28 | 16 | 10 | 17 | 18 |
| Composition (parts by weight) | | | | | | | | |
| NR | — | — | — | — | 100 | 100 | — | — |
| HANR | — | — | — | — | — | — | 100 | — |
| Polymer 1 | — | — | — | — | — | — | — | 100 |
| Polymer 2 | 100 | — | — | — | — | — | — | — |
| Polymer 3 | — | 100 | — | — | — | — | — | — |

TABLE 7-continued

|  | Ex. | | | | Com. Ex. | | | |
| --- | --- | --- | --- | --- | --- | --- | --- | --- |
|  | 25 | 26 | 27 | 28 | 16 | 10 | 17 | 18 |
| Polymer 4 | — | — | 100 | — | — | — | — | — |
| Polymer 5 | — | — | — | 100 | — | — | — | — |
| Silica | 50 | 50 | 50 | 50 | 50 | 50 | 50 | 50 |
| Silane Coupling Agent A | — | — | — | — | — | 5 | — | — |
| Silane Coupling Agent B | 5 | 5 | 5 | 5 | 5 | — | 5 | 5 |
| Antioxidant | 1 | 1 | 1 | 1 | 1 | 1 | 1 | 1 |
| Stearic Acid | 2 | 2 | 2 | 2 | 2 | 2 | 2 | 2 |
| Zinc Oxide | 3 | 3 | 3 | 3 | 3 | 3 | 3 | 3 |
| Sulfur | 2 | 2 | 2 | 2 | 1.7 | 1.5 | 2 | 2 |
| Vulcanization Accelerator TBBS | 1 | 1 | 1 | 1 | 1 | 1 | 1 | 1 |
| Vulcanization Accelerator DPG | 0.5 | 0.5 | 0.5 | 0.5 | 0.5 | 0.5 | 0.5 | 0.5 |
| Properties |  |  |  |  |  |  |  |  |
| Processability | 104 | 102 | 104 | 102 | 100 | 92 | 102 | 104 |
| Rolling Resistance | 102 | 101 | 104 | 103 | 100 | 101 | 101 | 103 |
| Abrasion Resistance | 102 | 103 | 101 | 102 | 100 | 100 | 99 | 96 |
| Wet Skid Performance | 103 | 104 | 105 | 107 | 100 | 101 | 99 | 101 |

According to the results of Tables 2 to 7, in Examples where a polymer, which is a specific modified natural rubber, was used, rolling resistance, abrasion resistance and wet grip performance were improved without losing processability, in comparison to Comparative Examples where the usual natural rubber was compounded.

Also, when natural rubber (HANR) having a high nitrogen content was used in the rubber component, wet grip performance decreased. When unmodified polymers were used in the rubber component, abrasion resistance decreased.

According to the present invention, by using the rubber composition for a tire tread described in claims 1, 2, 3, 4 and 5 for a tire tread, a pneumatic tire can be obtained, in which abrasion resistance and wet grip performance are excellent and rolling resistance is reduced without losing processability.

What is claimed is:

1. A pneumatic tire having a tread formed of a rubber composition comprising:

100 parts by weight of a rubber component containing at least 5% by weight of natural rubber graft-copolymerized with an organic compound having an unsaturated bond and/or epoxidized natural rubber, and 5 to 150 parts by weight of silica with a nitrogen-absorbing specific surface area of 100 to 300 m²/g, and a silane coupling agent which fulfills the following formula (1)

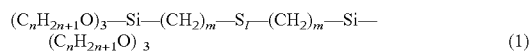

(1)

wherein in said formula (1) n is an integer of 1 to 3, m is an integer of 1 to 4, l is an integer of 2 to 8 and the average value of l is 2.1 to 3.5, wherein protein within said natural rubber graft-copolymerized with an organic compound having an unsaturated bond and epoxidized natural rubbers, contains an amount of protein converted to nitrogen content of at most 0.10% by weight.

2. The pneumatic tire of claim 1, wherein a silane coupling agent is contained in an amount of 1 to 20% by weight of said silica.

3. The pneumatic tire of claim 1, wherein the silica is present in an amount of 10 to 120 parts by weight.

4. The pneumatic tire of claim 1, wherein the silica is present in an amount of 15 to 100 parts by weight.

5. The pneumatic tire of claim 1, wherein the silane coupling agent is present in an amount of 2 to 15% by weight of the weight of silica.

6. The pneumatic tire of claim 3, wherein the silane coupling agent is present in an amount of 2 to 15% by weight of the weight of silica.

7. The pneumatic tire of claim 4, wherein the silane coupling agent is present in an amount of 2 to 15% by weight of the weight of silica.

8. The pneumatic tire of claim 1, wherein the silane coupling agent is selected from the group consisting of bis(3-triethoxysilylpropyl)polysulfide, bis(2-triethoxysilylethyl)polysulfide, bis(3-trimethoxysilylpropl)polysulfide, bis(2-trimethoxysilylethyl)polysulfide, bis(4-triethoxysilylbutyl)polysulfide and bis(4-trimethoxysilylbutyl) polysulfide.

9. A tire tread which consists essentially of 100 parts by weight of a rubber component containing at least 5% by weight of natural rubber graft-copolymerized with an organic compound having an unsaturated bond and/or epoxidized natural rubber, and 5 to 150 parts by weight of silica with a nitrogen-absorbing specific surface area of 100 to 300 m²/g, and a silane coupling agent which fulfills the following formula (1)

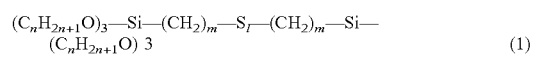

(1)

wherein in said formula (1) n is an integer of 1 to 3, m is an integer of 1 to 4, l is an integer of 2 to 8 and the average value of l is 2.1 to 3.5, wherein protein within said natural rubber graft-copolymerized with an organic compound having an unsaturated bond and epoxidized natural rubber, contains an amount of protein converted to nitrogen content of at most 0.10% by weight.

10. The tire thread of claim 9, wherein the amount of protein is 0.03 to 0.05'% by weight.

* * * * *